United States Patent Office

3,136,820
Patented June 9, 1964

3,136,820
AMINE BORANES
Mack W. Hunt, Ponca City, Okla., assignor to Continental Oil Company, Ponca City, Okla., a corporation of Delaware
No Drawing. Filed Aug. 3, 1959, Ser. No. 831,034
13 Claims. (Cl. 260—583)

This invention relates to the preparation of compounds of boran and more particularly to the preparation of amine boranes.

It is an object of the present invention to provide a process for the production of amine boranes which is simple to operate as well as being inexpensive in operation. It is another object of my invention to provide a process in which a borate ester is reacted with a tertiary amine in the presence of an alkaline earth metal, hydrogen, and a catalyst. Further objects and advantages of the invention will become apparent from the following description.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principle of the invention may be employed.

In brief, the foregoing objects and advantages are attained by a process which comprises reacting a borate ester with a tertiary amine in the presence of a catalyst, hydrogen, and an alkaline earth metal and under superatmospheric pressures and elevated temperatures.

Before proceeding with specific examples illustrating my invention, it may be well to indicate in general the nature of the materials and the operating conditions required in the process.

Suitable borate esters are those of the general formula $B(OR)_3$ in which R is an alkyl group having a carbon content varying from 1 to 18. Preferred esters are those wherein the carbon content varies from 1 to 5.

Suitable tertiary amines are those of the general formula $NR_3$ wherein R is an alkyl group containing from 1 to 10 carbon atoms. I prefer those in which the carbon content of the alkyl groups vary from 1 to 4. In addition to tertiary aliphatic amines I may also use tertiary aromatic amines.

Although any of the alkaline earth metals may be used, I prefer metallic magnesium.

Suitable catalysts are those known as "corrosion" catalysts. Specific catalysts falling within this classification which I have found particularly suitable include: mercuric chloride, magnesium iodide, iodine, alkyl halides, and the so-called Gilman's catalysts. An important feature of these catalysts is their ability to keep the surface of the alkaline earth metal in a reactive condition.

As to the pressure that may vary from about 800 to 5000 p.s.i.g. I prefer, however, to operate within a pressure range of 1800 to 3500 p.s.i.g.

A suitable temperature range varies from about 220 to 400° C. I prefer to operate, however, within a more limited temperature range of from 275 to 350° C.

Suitable solvents are those that will not react with itself or with any of the reactants present in the process under the reaction conditions. This will include such solvents as ethers and hydrocarbons both aliphatic and aromatic. I prefer to employ a solvent that has a boiling point sufficiently low so that it can be removed from the other components in the reaction mixture by distillation but high enough that losses through evaporation are not excessive. Also, if the solvent has a low boiling point it will form explosive mixtures with air readily and as a consequence the use of such a compound can be hazardous. As a rule, suitable solvents are those having boiling points within the range of about 30 to 200° C. A specific solvent should be so chosen that it can be separated easily from the other components in the reaction mixture by distillation.

Generally time, temperature, and pressure at which the reaction is carried out are interdependent within the range of stability of the compounds concerned. When the process is operated at high temperatures and pressures the time of reaction will be short. If either or both are low the time of the reaction must accordingly be extended. Within the temperature and pressure ranges specified above the time may vary from 1 to 12 hours.

The reaction may be expressed by the following equation:

wherein M is an alkaline earth metal and the R's are alkyl radicals as defined above. The foregoing equations shows that the components can be used in the molar ratio as follows: 3 moles of the metal, 2 moles of the ester, and 2 moles of the amine. In practice I prefer to use a slight excess of the amine, sometimes as much as double that required by the equation. Hydrogen, of course, is always used in a large excess.

Following the reaction the amine borane can be recovered from the metal alcoholate by distillation.

The amine borane can be used to prepare diborane by treatment with boron fluoride, boron trichloride or their etherates or any strong Lewis acid in accordance to the following equation:

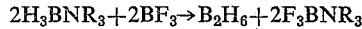

Regeneration of $BF_3$ and the $NR_3$ may be carried out as follows:

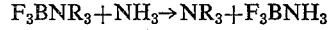

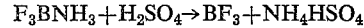

In order to disclose the nature of the present invention still more clearly an illustrative example will hereinafter be described. It should be understood, however, that this is done purely for purposes of illustration and is not to be considered a limitation upon the spirit or scope of the invention.

Example 1

A charge comprising 1.5 moles of metallic magnesium, 1.0 mole of triisobutyl borate, 1.0 mole of triethyl amine, a small amount of mercuric chloride as a catalyst, and 1.2 moles of methyl cyclohexane was added to a stainless steel, high pressure reaction vessel. Hydrogen was then injected into the vessel to a pressure of 1825 p.s.i.g. after which the reaction mixture was heated to a temperature of 300° C. with agitation for a period of 1½ hours. The maximum pressure attained during the reaction was 3900 p.s.i.g. Due to consumption of hydrogen in the reaction a decrease in presure was noted. Upon completion of the reaction triethyl amine borane was recovered from the reaction mixture by distillation in a yield corresponding to 74 percent of theory.

Examples 2–4

In these examples the procedure of Example 1 was followed with the exception:

In Example 2, 1.0 mole of trimethyl amine was substituted for the triethyl amine used in Example 1.

In Example 3, 1.0 mole of tripropyl amine was substituted for the triethyl amine used in Example 1.

In Example 4, 1.0 mole of triethyl borate was substituted for the triisobutyl borate used in Example 1.

The yields of the corresponding amine boranes varied from 74 percent of theory to almost quantitative.

Similar results were obtained when the other "corrosion" catalysts listed above were substituted for mercuric chloride.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. A single step method for the preparation of an amine borane which comprises reacting a trialkyl borate whose alkyl groups each contain from 1 to 5 carbon atoms with a trialkyl amine whose alkyl groups each contain from 1 to 4 carbon atoms in the presence of hydrogen, an alkaline earth metal and a catalyst selected from the group consisting of mercuric chloride, magnesium iodide, iodine and lower alkyl halides at a temperature within the range of 220 to 440° C. and a pressure of about 800 to 5000 p.s.i.g.

2. The method of claim 1 wherein the trialkyl borate is triisobutyl borate.

3. The method of claim 1 wherein the trialkyl borate is triethyl borate.

4. The method of claim 1 wherein the trialkyl amine is trimethyl amine.

5. The method of claim 1 wherein the trialkyl amine is tripropyl amine.

6. The method of claim 1 wherein the pressure is varied from 1800 to 3500 p.s.i.g.

7. The method of claim 6 wherein the temperature is varied from 275 to 350° C.

8. A single step method of manufacture of an amine borane which comprises reacting a trialkyl borate whose alkyl groups each contain from 1 to 5 carbon atoms with a trialkyl amine whose alkyl groups each contain from 1 to 4 carbon atoms in the presence of hydrogen, magnesium and mercuric chloride catalyst at a temperature within the range of 220 to 400° C. and a pressure of about 800 to 5000 p.s.i.g.

9. A single step method of manufacture of triethylamine borane which comprises reacting a trialkyl borate whose alkyl groups each contain from 1 to 5 carbon atoms with triethylamine in the presence of magnesium, mercuric chloride catalyst and hydrogen under a pressure of about 1800 to 3900 p.s.i.g. and a temperature of 275 to 350° C. and recovery of triethylamine borane from the reaction mixture.

10. A single step method of manufacture of an amine borane which comprises reacting 2 moles of a trialkyl borate whose alkyl groups each contain from 1 to 5 carbon atoms with 2 moles of a trialkyl amine whose alkyl groups each contain from 1 to 4 carbon atoms, 3 moles of magnesium metal and a molar excess of hydrogen under a pressure of about 800 to 5000 p.s.i.g. in the presence of a small amount of mercuric chloride as catalyst and at a temperature within the range of 220 to 400° C.

11. The method of claim 10 in which the trialkyl amine is trimethylamine.

12. The method of claim 10 in which the trialkyl amine is tripropylamine.

13. The method of claim 10 in which the trialkyl amine is triethylamine.

References Cited in the file of this patent

UNITED STATES PATENTS

| | | |
|---|---|---|
| 2,469,879 | Hurd | May 10, 1949 |
| 2,744,810 | Jackson | May 8, 1956 |
| 2,860,167 | Brown | Nov. 11, 1958 |
| 2,985,510 | Kalb | May 23, 1961 |

OTHER REFERENCES

Schechter et al.: "Boron Hydrides and Related Compounds," page 20 (1951).

UNITED STATES PATENT OFFICE
CERTIFICATE OF CORRECTION

Patent No. 3,136,820            June 9, 1964

Mack W. Hunt

It is hereby certified that error appears in the above numbered patent requiring correction and that the said Letters Patent should read as corrected below.

Column 2, line 20, for "equations" read -- equation --; column 2, line 57, for "presure" read -- pressure --; column 3, line 20, for "220 to 440° C." read -- 220 to 400° C. --.

Signed and sealed this 10th day of November 1964.

(SEAL)
Attest:

ERNEST W. SWIDER
Attesting Officer

EDWARD J. BRENNER
Commissioner of Patents